UNITED STATES PATENT OFFICE.

RUDOLF BERENDES AND ERICH RIETZ, OF ELBERFELD, GERMANY, ASSIGNORS TO SYNTHETIC PATENTS CO., INC., OF NEW YORK, N. Y., A CORPORATION OF NEW YORK.

MAGNESIUM SALTS OF ACYLATED AROMATIC ORTHO-OXYCARBOXYLIC ACIDS.

1,113,742. Specification of Letters Patent. Patented Oct. 13, 1914.

No Drawing. Application filed January 5, 1914. Serial No. 810,429.

*To all whom it may concern:*

Be it known that we, RUDOLF BERENDES and ERICH RIETZ, doctors of philosophy, chemists, citizens of the German Empire, residing at Elberfeld, Germany, have invented new and useful Improvements in Magnesium Salts of Acylated Aromatic Ortho-Oxycarboxylic Acids, of which the following is a specification.

This invention relates to new magnesium salts of acylated aromatic ortho-oxycarboxylic acids and more particularly to the magnesium salt of the acetylsalicylic acid, which have proved to be valuable therapeutic compounds which while retaining the valuable medicinal properties of the acetyl-salicylic acid are more soluble than the acid itself. Furthermore the new compounds unite the medicinal properties of the acetyl-salicylic acid with that of magnesium. The new products can be obtained by combining acylated aromatic oxycarboxylic acids such as acetyl-salicylic acid, acetyl-meta-cresotinic acid, acetyl-para-cresotinic acid, etc., in an aqueous suspension with a magnesium compound *e. g.* magnesium carbonate, magnesium oxid or hydroxid and isolating and purifying profitably with acetone the magnesium salts thus produced.

The new salts are after being dried generally crystalline colorless powders soluble in water and alcohol and soluble with difficulty in ether and acetone.

The following specific example further illustrates the present invention. In this example the magnesium salt of acetyl-salicylic acid and its method of preparation are described.

7.20 parts of acetyl-salicylic acid are suspended into 10 parts of water and 1.68 parts of magnesium carbonate while stirring are added to this suspension. A violent disengagement of carbonic acid takes place whereby the components are dissolved. It is then stirred until the production of the scum has disappeared. After this a small quantity of insoluble compounds are filtered off, the residue is washed with a small quantity of water and the solution is evaporated *in vacuo* at a temperature of 40–45° C. until a crystalline mass is obtained. The salt thus separated is removed from the mother lye by filtration or by pressing out and finally washed with acetone until a test dissolved in water on the addition of ferric chlorid does not yield a violet tint but a precipitation dyed reddish-yellow. The magnesium salt of acetylsalicylic acid having most probably the formula

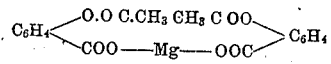

thus obtained is a colorless crystalline mass soluble in alcohol and water and difficultly soluble in ether and acetone.

We claim:—

1. The new products being chemically magnesium salts of acylated aromatic ortho-oxy-carboxylic acids, which salts are after being dried generally crystalline colorless powders soluble in alcohol and water and difficultly soluble in ether and acetone and which have proved to be valuable therapeutic compounds, substantially as described.

2. The new product being chemically the magnesium salt of acetyl-salicylic acid having most probably the formula:

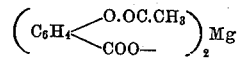

which salt is after being dried a crystalline colorless powder soluble in alcohol and water and difficultly soluble in ether and acetone and which has proved to be a valuable therapeutic compound, substantially as described.

In testimony whereof we have hereunto set our hands in the presence of two subscribing witnesses.

RUDOLF BERENDES. [L. S.]
ERICH RIETZ. [L. S.]

Witnesses:
  HELEN NUFER,
  ALBERT NUFER.